May 27, 1969  R. A. WILLYARD  3,446,300
WEIGHING SCALE KEYBOARD TARE ADJUSTMENT MEANS
Filed March 14, 1966  Sheet 1 of 3
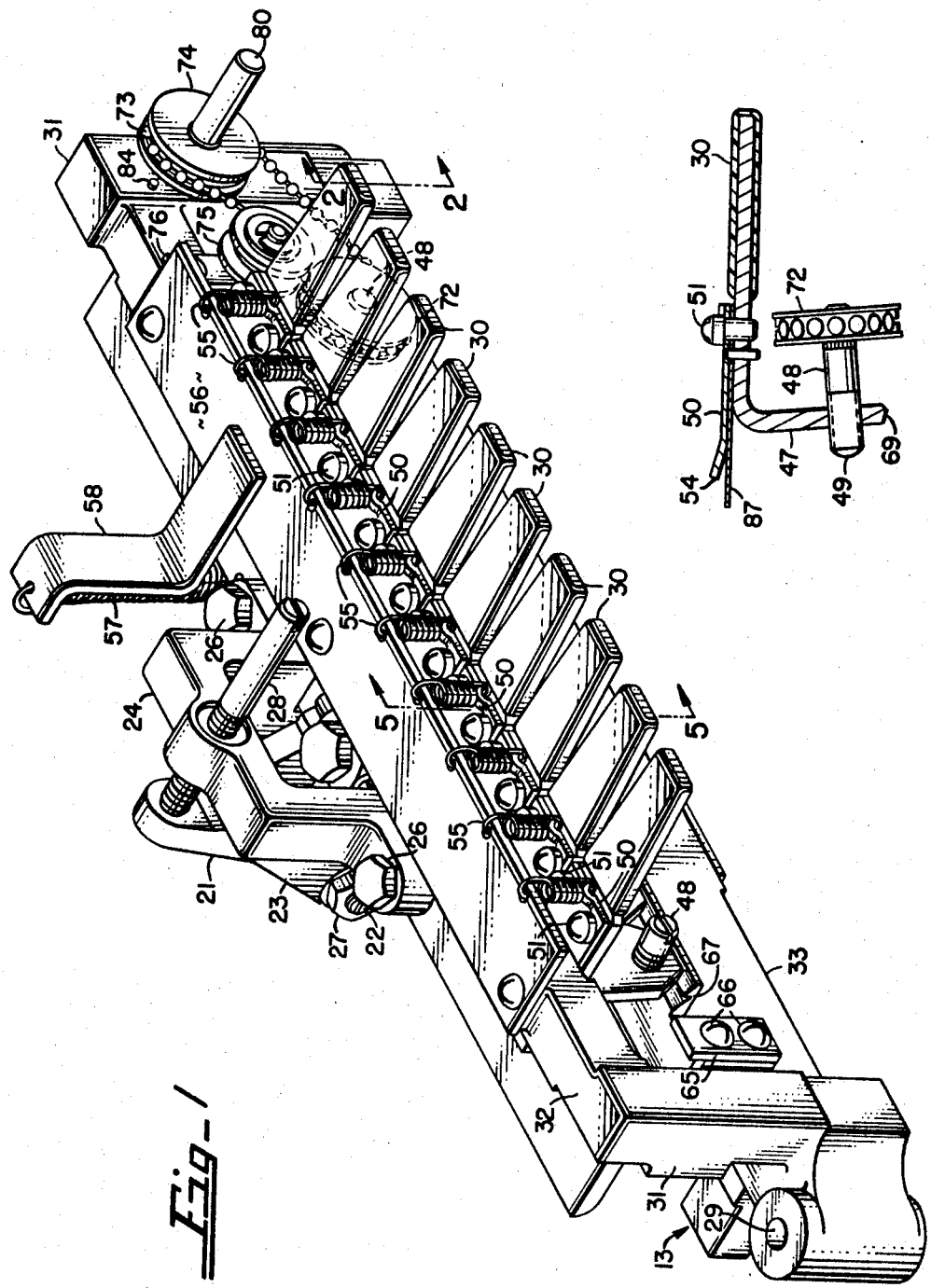
INVENTOR.
ROGER A. WILLYARD
BY
Thomas H. Grafton
ATTORNEY

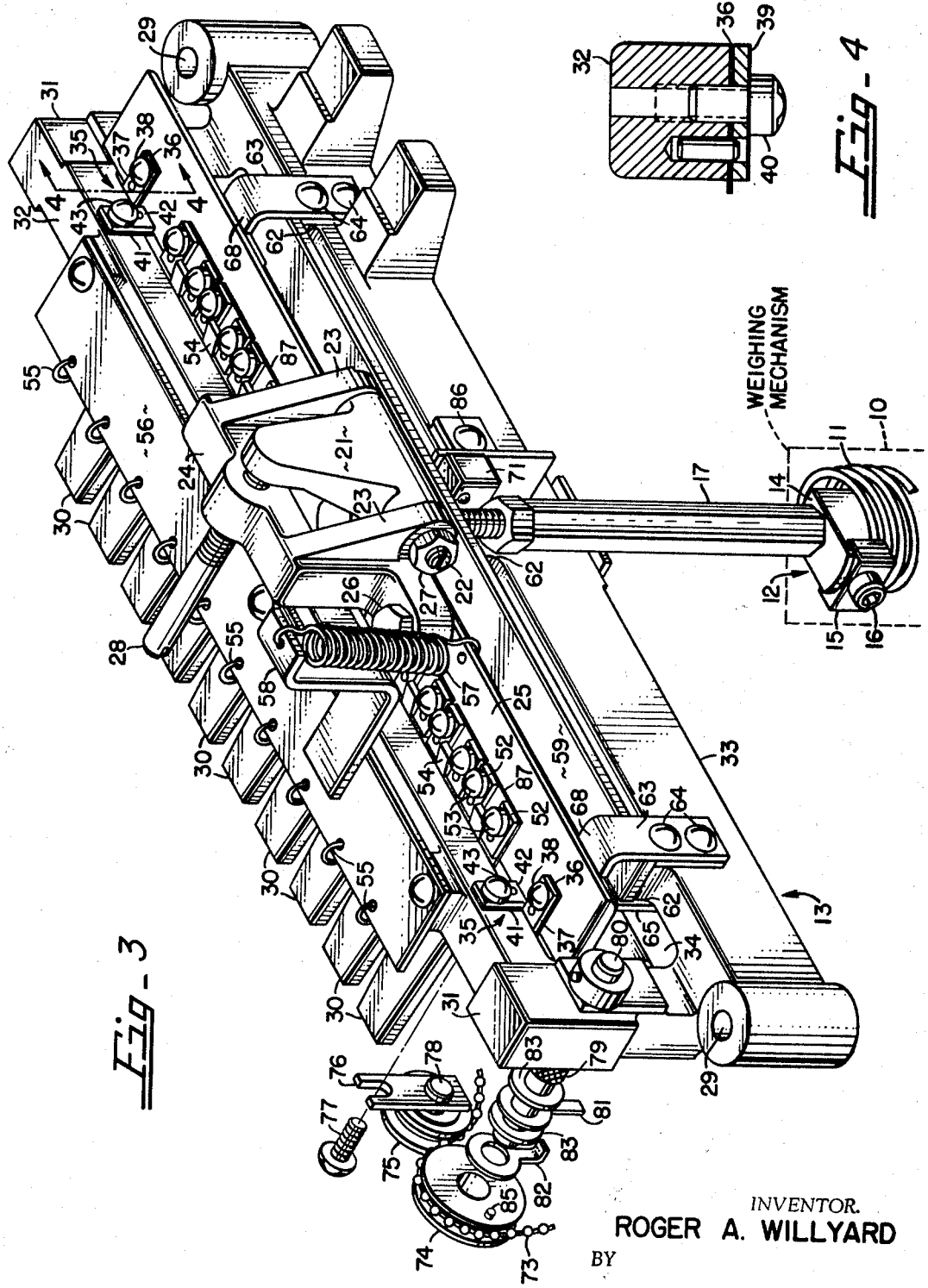

United States Patent Office 3,446,300
Patented May 27, 1969

3,446,300
WEIGHING SCALE KEYBOARD TARE
ADJUSTMENT MEANS
Roger A. Willyard, Toledo, Ohio, assignor, by mesne assignments, to The Reliance Electric and Engineering Company, Toledo, Ohio, a corporation of Ohio
Filed Mar. 14, 1966, Ser. No. 534,218
Int. Cl. G01g 23/14
U.S. Cl. 177—168                  12 Claims

ABSTRACT OF THE DISCLOSURE

A weighing scale having a keyboard for making stepwise tare adjustments. The scale includes a load counterbalancing spring, first and second bell crank means for making zero adjustments, and a latch bar with a cam portion for releasing previously operated keys of said keyboard. The tare adjustment means includes springs to obtain the predetermined tare adjustments and an adjustment screw for fine tare adjustments.

---

This invention relates to weighing scales and more particularly to improved means for making tare adjustments in weighing scales.

The improved tare adjustment means is particularly useful in retail scales of the type disclosed in U.S. Patent No. 2,937,862 issued May 24, 1960 to Lawrence S. Williams. In the prior scale which is a projected indication scale, in order that the tare weight of a container placed upon the scale may be offset, a tare knob is turned until zero weight is indicated on a display screen, or, if the weight of the container is known, the tare knob can be turned when the container is not upon the scale until the tare indication behind zero (see FIG. XIII in the patent) indicates the tare weight on the display screen. After the container is filled, the net weight is indicated on the screen. Other prior retail scales use calibrated tare knobs to facilitate making tare adjustments. These prior tare adjustment means are generally unsatisfactory because care must be taken to align the projected image on the display screen with an index line or to align the calibrated knob with an index line resulting in mistakes and in waste of time.

The objects of this invention are to improve weighing scales, to improve tare adjustment devices in weighing scales, to increase the precision of such devices, to facilitate the mechanical adjustment of such devices, to simplify the operation of such devices, and to provide new techniques for making tare adjustments in weighing scales which reduce the chances of operator's mistakes.

One embodiment of this invention enabling the realization of these objects is a tare adjustment device, comprising push buttons or levers or keys, which is shown incorporated in the weighing scale disclosed in the above U.S. Patent No. 2,937,862. Each push button or lever or key, except one, corresponds to a container having a certain tare weight so that when the operator, for example, places container number 8 upon the scale he merely pushes tare lever number 8 to tare it off, the tare lever number 8 having been preadjusted to vary the tare mechanism an amount corresponding to the weight of the respective container. Such excepted one of the push levers is used to condition an ordinary tare knob for operation.

In accordance with the above, one feature of this invention resides in the fact that the operator cannot make a mistake in setting the correct tare provided he selects the proper push lever.

Another feature resides in the design of the push lever tare mechanism which is such that reproducible tare settings are attained time after time during long periods of use.

The above and other objects and features of this invention will be appreciated more fully from the following detailed description when read with reference to the accompanying drawings wherein:

FIG. 1 is a front perspective view of the push lever tare mechanism;

FIG. 2 is a vertical sectional view taken along the line 2—2 of FIG. 1;

FIG. 3 is a rear perspective view of the push lever tare mechanism showing its connection to a weighing scale;

FIG. 4 is a vertical sectional view taken along the line 4—4 of FIG. 3;

Figure 5:
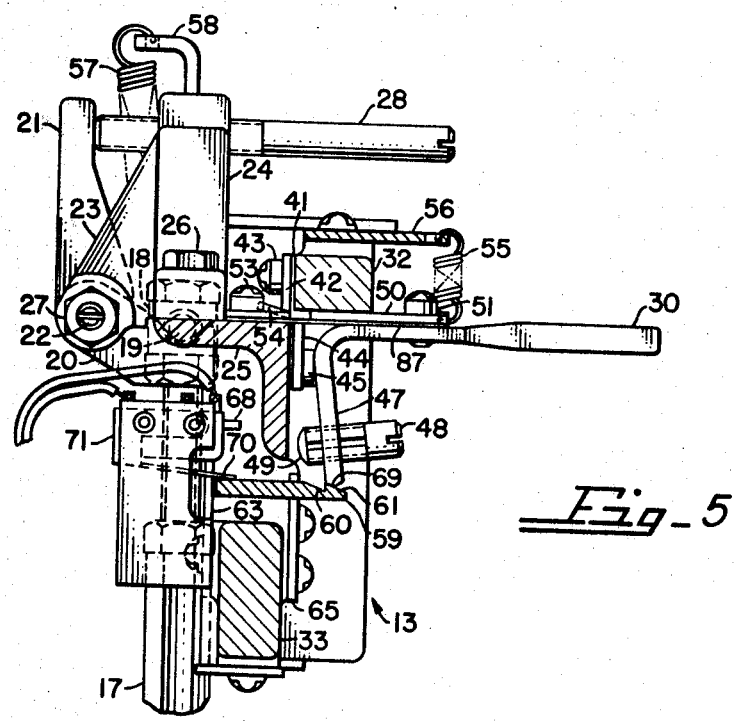
FIG. 5 is an enlarged vertical sectional view taken along the line 5—5 of FIG. 1.

Referring to the drawings, weighing mechanism 10 is disclosed in the above U.S. Patent No. 2,937,862 and includes a pivotably mounted lever to which load forces are applied. Such load forces acting on the lever are transmitted to a helical load counterbalancing spring 11 which is connected at its upper end through a calibrator clamp 12 to a frame 13 of the scale and at its lower end through a similar clamp which is not shown to the lever (not shown).

The clamp 12 includes a block 14, a clamp member 15 and a screw 16, an end of the spring 11 being clamped between the block 14 and the clamp member 15 which is held in place by the screw 16. The block 14 is attached to the lower end of a threaded rod 17 which is attached at its upper end to a trunnion 18 (FIG. 5) having horizontally extending pins 19 which rest in V-shaped bearing surfaces of a bifurcated portion 20 of a bell crank 21, the threaded rod 17 being rockable about the axes of the pins 19. A similar threaded rod, bell crank and pivotal connection therebetween is shown in FIG. I in the above U.S. Patent No. 2,937,862. The bell crank 21 is rockable about the axes of cone-pointed screws 22 which are threaded through the ears 23 of a bracket 24 fixedly mounted on an angle 25 by means of screws 26. The screws 22 cooperate with conical depressions in the bell crank 21 and are held against turning by lock nuts 27 which are so adjusted that the bell crank is free to rock yet is mounted with a minimum of play.

The bell crank 21 is rocked by turning a zero adjustment screw 28 that is threaded through the bracket 24 to move an end of the screw toward or away from the upper end of the bell crank 21. Force provided by the spring 11 always urges the bell crank 21 against the end of the adjustment screw 28 and the trunnion pins 19 against the bearing surfaces of the bifurcated portion 20 of the bell crank. Zero adjustment is made by turning the screw 28 until zero weight indication is displayed on the screen (not shown) when no load is upon the scale, such adjustment of the screw 28 causing the bell crank to pivot and position the spring 11 along with the working parts operating in unison therewith.

Figure 6:
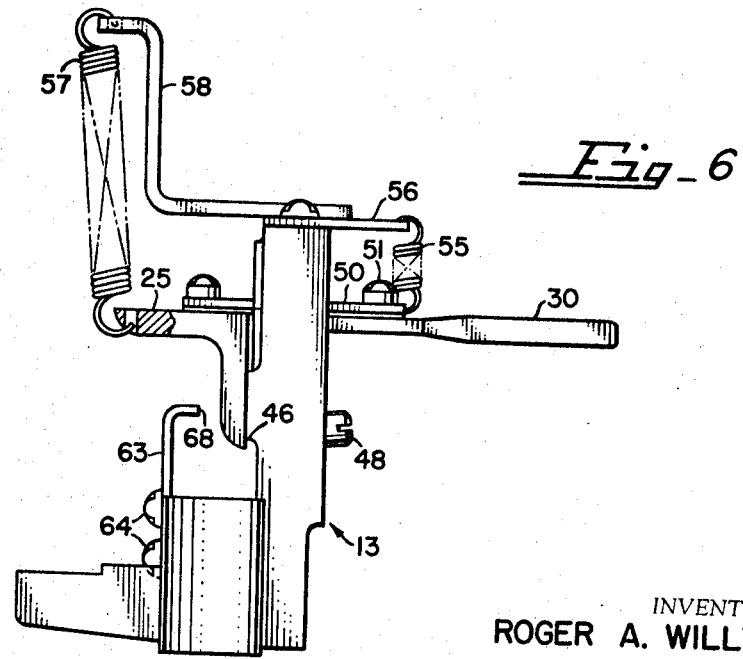
FIG. 6 is an enlarged, fragmentary end elevational view as seen looking toward the lower end of the device as shown in FIG. 1.

The angle 25, to which the bracket 24 is attached by means of the screws 26 and thus which carries the bell crank 21 to which the upper end of the spring 11 is pivotably connected, is a part of the push lever tare adjustment mechanism of the invention. The angle 25 is pivotably connected to the frame 13 which is mounted by means of opening 29 atop frame posts that are not shown but which are like posts 61 shown in FIG. I of the above U.S. Patent No. 2,937,862. The frame 13 is so positioned that push levers or keys 30 extend horizontally and outwardly from the front of the scale in a position where they are readily available to an operator standing in front of the scale. The frame 13 (one piece casting) includes a pair of vertical legs 31 and an upper transverse portion 32 and a lower transverse portion 33 extending therebetween, there being an open space 34 between the upper and lower frame portions. The angle 25 which may be termed an elongated bell crank is pivotably connected to the frame 13 by means of two pairs of cross flexure ribbons 35 at the apex of the triangle formed by the legs of the angle so that as viewed in section in FIG. 5 the angle is seen to form a bell crank. One of the pairs of cross flexure ribbons 35 is mounted at one end of the angle 25 and the other one of the pairs of cross flexure ribbons 35 is mounted at the other end of the angle 25 as shown in FIG. 3. Each of the pairs of cross flexure ribbons 35 includes a horizontal spring flexure 36 (FIG. 3) which is clamped to a horizontal leg of the angle 25 by means of a plate 37 and screw 38 and which extends underneath the upper transverse frame portion 32 and is clamped in a similar manner thereto by means of a plate 39 and screw 40 (FIGS. 1 and 4). Each of the pairs of cross flexure ribbons 35 also includes a vertical spring flexure 41 (FIGS. 3 and 5) which is clamped to the back of the upper transverse frame portion 32 by means of a plate 42 and screw 43 and which extends downwardly to the vertical leg of the angle 25 and is clamped in a similar manner thereto by means of a plate 44 and screw 45 (FIG. 5). This pivots the angle 25 for rotative movement about an axis defined by the crossing of the flexure ribbons. As viewed in section in FIG. 5, the angle 25 is rockable about an axis located at the apex of the triangle formed by the legs of the angle 25. Such rocking of the angle 25 which carries the bell crank 21 produces a tare adjustment by positioning the spring 11, pivotably connected to the bell crank 21, along with the working parts operating in unison therewith. Zero adjustment as described above is made by turning the screw 28 to rock the bell crank 21 about the axes of the screws 22 and tare adjustment is made by rocking the angle 25 to move the bell crank 21 and its connecting bracket 24 up or down bodily. In its home position, the vertical leg of the angle 25 bears, under the action of the sprng 11, on three flats 46 on the frame 13 one of which flats 46 is shown in FIG. 6.

The angle 25 is rocked through predetermined arcs to effect the tare adjustments by means of the push levers 30 each of which is pivotably mounted on the angle 25 and each of which has a leg 47 carrying an adjustment screw 48 having an end 49 that engages the vertical leg of the angle 25 when such screw 48 is in operated position. Each of the push levers 30 is pivotably mounted on the angle 25 by means of a flexure ribbon 87 which is clamped to the push lever 30 by means of a clamp plate 50 and two screws 51 and which extends over the horizontal leg of the angle 25 and is clamped thereto by means of a pair of spaced-apart plates 52 and screws 53. The clamp plates 50 each are provided with a bent-up tongue 54 which is located between a pair of the spaced-apart plates 52 (see FIG. 3). Initial depression of the push levers 30 causes them to bend the flexure ribbons 87 and rock on the bent-up tongue 54. Depression of the push levers 30 is in opposition to return coil springs 55, one for each push lever 30, which extend between the clamp plates 50 on the push levers and a plate 56 mounted atop the upper transverse frame portion 32 and is aided by a coil spring 57 which extends between the pivotably mounted angle 25 and a bracket 58 atop the plate 56. The coil spring 57 takes up some of the initial pull of the spring 11 (FIG. 3) to make depression of the levers 30 easier.

The push levers 30 are held in depressed operated positions by a latch bar 59 having a groove 60 and a cam end 61. The latch bar 59 rests on three horizontal flats 62 (FIG. 3) of the lower transverse portion 33 of the frame 13 and is held loosely against movement to the left as viewed in FIG. 5 by two vertical brackets 63 (both shown in FIG. 3) attached to the lower transverse frame portion 33 by means of screws 64, loosely against movement to the right as viewed in FIG. 5 by two vertical plates 65 (one shown in FIG. 1 and the other shown in FIG. 3) attached to the lower transverse frame portion 33 by means of screws 66, and loosely against movement in a direction parallel to its length by engagement of its notched corners 67 with the vertical plates 65. The vertical brackets 63 are provided with bent-down ends 68 which function as stops limiting movement of the vertical leg of the angle 25 to the left as viewed in FIG. 5.

Depression of the push levers 30 causes pointed ends 69 of the push lever legs 47, which when the push levers 30 are in their non-operated or non-depressed positions engage the cam ends 61 of the latch bar 59 as shown in FIG. 5, to cam the cam end 61 downwardly in opposition to a switch-operating spring arm 70 and in opposition to the force of gravity until the push lever end 69 becomes caught in the groove 60 of the latch bar 59. As the cam end 61 of the latch bar 59 is moved downwardly, the latch bar 59 as viewed in FIG. 5 pivots clockwise at the vertical plates 65 lifting the left side of the latch bar 59 upwardly to move the spring arm 70 operating a switch 71 momentarily, the switch 71 being attached by means of screw 86 (FIG. 3) to the lower transverse frame portion 33. The pivoting action is only momentary because as soon as the push lever end 69 is received in the groove 60 of the latch bar 59 the latch bar 59 falls back under the influence of the spring arm 70 and under the influence of gravity into its position shown in FIG. 5. Switch 71 is shown in the circuit which it helps control in U.S. application Ser. No. 429,230 filed Feb. 1, 1965 in the names of William C. Susor and Orval J. Martin (switch 69 in the prior application). An understanding of the function of the switch is not necessary to an understanding of the push lever tare mechanism of the invention which is operative with the switch removed, i.e., the force of gravity alone is sufficient to return the latch bar 59 to its FIG. 5 position.

Each of the push levers 30 can be depressed slightly to release a previously operated lever 30 without being caught in the latch bar notch 60 or each of the push levers 30 can be depressed fully to its operated position to release a previously operated push lever 30 and to be caught in the latch bar notch 60. Slight depression of a push lever 30 cams the cam end 61 of the latch bar 59 downwardly enough to release any previously latched push lever 30 and to permit the spring 55 operatively connected to such push lever 30 to pull it up to its home or unoperated position (FIG. 5 position) and release by the operator of such slightly depressed push lever 30 before it becomes latched by the latch bar 59 permits it also to return to its home position. FIG. 1 shows all of the push levers 30 in their unoperated positions. Full depression of a push lever 30 similarly causes release of a previously operated push lever 30 and also causes the newly operated push lever to be latched in operated position (caught in the latch bar notch 60).

Nine of the push levers 30 (all except the right hand end lever 30 as viewed in FIG. 1) carry the adjustment screws 48 adjusted to engage and drive the pivotable angle 25 a predetermined distance to make a tare adjustment corresponding to a container of a certain weight. For example, the nine push levers 30 may correspond to containers having nine different weights which are used in prepackaging foods for retail sale. Push lever number one corresponds to, for example, boat number one used for packaging hamburg. The adjustment screw 48 of such push lever number one is so adjusted that when boat number one is upon the scale and push lever number one is operated the scale indicates zero, so that when one pound of a commodity is placed in the boat the scale indicates one pound net weight. One feature of this invention resides in the fact that the operator cannot make a mistake in setting the correct tare provided he selects the proper push lever 30.

Depression of a push lever 30 first causes it to bend its flexure ribbons 87 and rock on its bent-up tongue 54 until the gap (see FIG. 5) between the end 49 of its adjustment screw 48 and the vertical leg of the pivotable angle 25 is closed. Then on engagement of the screw 48 with the angle 25, the push lever 30 and the angle 25 rotate together as one about the end flexures 36 and 41. One of the features of the invention resides in this construction which is such that reproducible tare settings are attained time after time during long periods of use.

One of the push levers 30, i.e., the right hand end lever 30 as viewed in FIG. 1, is provided with a pulley 72 (FIGS. 1 and 2) fixed on its adjustment screw 48. The pulley 72 is driven by a beaded drive chain 73 (FIGS. 1 and 3) which runs around the pulley 74 and underneath an idler pulley 75. The idler pulley 75 is pivotally mounted from the upper transverse frame portion 32 by means of a bracket 76, which is attached to the frame portion by means of a screw 77, and a shaft 78 extending from such bracket. The pulley 74 is force fitted over a knurled portion 79 (FIG. 3) of a shaft 80 which is journaled in the left hand one of the frame legs 31 as viewed in FIG. 3. Also mounted on the shaft 80 between the pulley 74 and the frame leg 31 are a first or straight stop member 81, a second or hooked stop member 82 and two spacers 83 which are located as shown in FIG. 3. The stop members 82 turn with the shaft 80, when a hand operated knob which is not shown but which is located on the extended end of the shaft 80 as seen in FIG. 1 is turned, about until the first stop member 81 engages a stop pin 84 (FIG. 1) extending from the frame leg 31 in one direction of rotation of the shaft 80 or until the first stop member 81 engages a similar stop pin which is not shown that is hidden behind the pulley 74 as viewed in FIG. 1 in the opposite direction of rotation of the shaft 80. When the first stop member 81 is stopped by one of the stop pins the shaft 80 still is free to turn. Soon thereafter the hooked stop member 82 is stopped by the stopped straight stop member, the shaft 80 still being free to turn, and then a pin 85 (FIG. 3) carried by the pulley 74 engages the stopped hooked member 81 and the shaft 80 is prevented from being turned further. The stops limit turning of the adjustment screw 48 associated with the pulley 72.

The push lever 30 which carries the pulley 72 is used to condition the ordinary tare shaft for operation. In operation, if an infinitely variable tare adjustment is to be made, such push lever 30 is operated to release any previously operated push lever. This carries the end 49 of the adjustment screw 48 shown in FIGS. 1 and 2 to a position closely juxtaposed to or into engagement with the pivotable angle 25. Then the operator makes a tare adjustment in the usual way, but through the push lever tare mechanism of the invention, by turning the shaft 80 to turn the pulleys 74 and 72 and thus the respective adjustment screw 48. Turning the adjustment screw when it is engaged with the pivotable angle 25 pivots the angle 25 as described above to set tare into the system. Accordingly, the tare adjustment mechanism functions as a push button device to set predetermined tare into the system or as a knob operated device to set selective tare into the system. Each of the push levers 30, except the right hand one as viewed in FIG. 1, corresponds to a container having a certain tare weight so that when the operator, for example, places container number eight upon the scale he merely pushes tare lever number eight to tare it off, the tare lever number eight having being preadjusted (screw 48) to move the pivotable angle 25 an amount corresponding to the weight of the respective container. Any one of such push levers 30 can be chosen as "push lever number eight," the remaining push levers 30 being made to correspond to other containers having other tare weights. The excepted one of the push levers 30 is used to condition the ordinary tare shaft 80 for operation which is used to adjust tare selectively in the same manner as the tare knob is used in the scale disclosed in the U.S. Patent No. 2,937,862.

Having described the invention, I claim:

1. A weighing scale comprising, in combination, load responsive mechanism including a load counterbalancing spring, and tare adjustment means for stepwise positioning the spring to obtain predetermined tare adjustments, said tare adjustment means including a plurality of keys for making each of said adjustments.

2. A weighing scale according to claim 1 wherein the tare adjustment means additionally includes means for making selective tare adjustments.

3. A weighing scale according to claim 2 wherein the means for making selective tare adjustments includes an adjustment screw carried by one of the keys and means for turning the screw for making infinitely variable tare adjustments.

4. A weighing scale comprising, in combination, load responsive mechanism, a frame, an elongated bell crank pivotally mounted on the frame and connected to the load responsive mechanism, and a plurality of key means for pivoting the bell crank through predetermined arcs and thus for positioning the mechanism to obtain a plurality of predetermined tare adjustments.

5. A weighing scale according to claim 4 wherein one of the key means is provided with means for pivoting the bell crank through selective arcs for making selective tare adjustments.

6. A weighing scale according to claim 4 wherein the elongated bell crank carries a second bell crank through which the elongated bell crank is connected to the load responsive mechanism, said second bell crank functioning to make selective zero adjustments.

7. A weighing scale according to claim 4 wherein the key means are pivotally mounted on the elongated bell crank.

8. A weighing scale comprising, in combination, load responsive mechanism, a frame, a member pivotally mounted on the frame and connected to the load responsive mechanism, a plurality of push levers pivotally mounted on the member, adjustment means carried by each push lever for driving engagement with the member, and latch means for retaining the last-operated push lever in operated position, operation of any one of the push levers releasing any previously operated push lever, the push levers functioning to drive the pivotally mounted member through the adjustment means in predetermined arcs to obtain predetermined tare adjustments.

9. A weighing scale comprising, in combination, load responsive mechanism, means including a plurality of selectively operable keys for setting the mechanism in predetermined positions, the keys being movable between home and operated positions, and lautch means for retaining the last-operated key in operated position, operation of any one of the keys releasing any previously operated key.

10. A weighing scale according to claim 9 wherein the latch means includes a latch bar defining a cam portion and the keys are engageable with said cam portion to release any previously operated key on movement to positions short of said operated positions, whereby all of the keys are released for return to said home positions.

11. A weighing scale according to claim 9 wherein one of the keys carries means for also setting the mechanism in selective positions.

12. A weighing scale comprising, in combination, load counterbalancing spring means, pivotally mounted bell crank means for supporting one end of the spring means, and tare adjustment means including a plurality of selectively operable keys for stepwise positioning the bell crank means and thus for stepwise positioning the spring means to obtain predetermined tare adjustments.

References Cited

UNITED STATES PATENTS

| 2,010,666 | 8/1935 | Haskins | 177—176 |
| 3,073,403 | 1/1963 | Bache | 177—230 |

FOREIGN PATENTS 116,882    7/1946    Sweden.

RICHARD B. WILKINSON, *Primary Examiner.*

LAWRENCE H. HAMBLEN, *Assistant Examiner.*

U.S. Cl. X.R.

177—164, 175, 230